United States Patent
Kashyap et al.

(10) Patent No.: US 10,565,153 B2
(45) Date of Patent: Feb. 18, 2020

(54) AUTO DETECTION AND ADAPTIVE CONFIGURATION OF HDMI PORTS

(71) Applicant: Caavo Inc, Santa Clara, CA (US)

(72) Inventors: Pankaj Kumar Kashyap, Pune (IN); Sharath Hariharpur Satheesh, Bangalore (IN); Shankara Raman Sundararajan, Bangalore (IN); Ashish Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 273 days.

(21) Appl. No.: 14/945,079

(22) Filed: Nov. 18, 2015

(65) Prior Publication Data

US 2016/0140075 A1 May 19, 2016

Related U.S. Application Data

(60) Provisional application No. 62/081,401, filed on Nov. 18, 2014.

(51) Int. Cl.
*G06F 13/42* (2006.01)

(52) U.S. Cl.
CPC .............. *G06F 13/4265* (2013.01)

(58) Field of Classification Search
CPC .............. G06F 13/4265; G06F 9/4411
See application file for complete search history.

(56) References Cited

U.S. PATENT DOCUMENTS

| | | | | |
|---|---|---|---|---|
| 9,329,672 B2* | 5/2016 | Du | ........................... | G06F 3/00 |
| 2007/0220150 A1* | 9/2007 | Garg | ...................... | G09G 5/006 709/226 |
| 2011/0283129 A1* | 11/2011 | Guillerm | ............... | G09G 5/006 713/324 |
| 2012/0274857 A1* | 11/2012 | Maxwell | ................ | H04L 12/12 348/720 |
| 2014/0126421 A1* | 5/2014 | Lida | ....................... | H04L 41/12 370/254 |
| 2015/0358675 A1* | 12/2015 | Xu | ........................ | H04N 5/765 348/706 |

\* cited by examiner

*Primary Examiner* — Tim T Vo
*Assistant Examiner* — Harry Z Wang
(74) *Attorney, Agent, or Firm* — Fiala & Weaver P.L.L.C.

(57) ABSTRACT

Methods, systems, circuits, devices, and apparatuses are described for auto-detection and adaptive configuration of high-definition multimedia interface (HDMI) ports. Unique systems and circuits allow HDMI repeaters to automatically detect if an HDMI device that has been connected thereto, via an HDMI port, is an HDMI source (source mode) or an HDMI sink (sink mode). The unique systems and circuits may be adaptively configured to allow the HDMI port to function as an HDMI input or an HDMI output based on the automatic detection. Methods corresponding to the functions performed by the systems and apparatuses are provided, and computer readable storage media with computer program instructions encoded thereon for enabling processing devices to perform the methods are also provided.

15 Claims, 10 Drawing Sheets

AUTO DETECTION AND ADAPTIVE CONFIGURATION OF HDMI PORTS

CROSS-REFERENCE TO RELATED APPLICATIONS

The present application claims priority to U.S. Application Ser. No. 62/081,401, entitled "AUTO DETECTION AND ADAPTIVE CONFIGURATION OF HDMI PORTS," filed on Nov. 18, 2014, the entirety of which is incorporated by reference herein.

BACKGROUND

Technical Field

The present invention relates to methods, systems, and apparatuses for auto-detection and adaptive configuration of high-definition multimedia interface (HDMI) ports.

Background Art

High-definition multimedia interface, or HDMI, is one of the fastest growing interfaces for audio and video consumption in the world today. Several terms are commonly used for HDMI enabled devices. An HDMI source is a device that sends an HDMI signal, such as a digital video disc (DVD) player or Set-top box. An HDMI sink is a device that receives an HDMI signal, such as a high-definition television (HDTV). An HDMI repeater is a device that both receives and sends HDMI signals, such as an audio/video receiver (AVR). AVRs are considered HDMI repeaters.

The HDMI interface has significantly reduced the complexity of connecting multiple audio and video cables between a source and a sink. However with the advent of multiple HDMI based devices like set-top boxes, gaming consoles, Blu-ray® players, AVR and streaming devices like Roku® and Chromecast®, and/or the like, the living room digital setup has become further complicated.

An HDMI repeater is commonly used to navigate through the above-mentioned complexity, but HDMI repeaters have their own shortcomings. In current configurations of repeaters, there is a dedicated "output" port that should be connected to a sink device, and pre-designated "input" ports that get connected to different source devices. This typical arrangement is shown as repeater configuration 100 in FIG. 1. Repeater configuration 100 includes a repeater 104 connected to a sink device 102 via an output port 'O1' over an HDMI connection 112. Repeater 104 is also connected to a first source device 106 via an HDMI connection 114, to a second source device 108 via an HDMI connection 116, and to a third source device 110 via an HDMI connection 118.

This typical repeater configuration 100 has two major shortcomings. The first is a lack of convenience/ease of doing the setup, and the second is the complexity of interconnection. That is, any incorrect connections can result in a malfunction that wastes an end user's time and also tests the end user's patience thus giving an unsatisfactory user experience.

To understand the complexity involved in a repeater configuration such as repeater configuration 100, the hardware design of a conventional repeater should first be understood. Typical HDMI repeaters use single or multi input/output HDMI transceiver chips (or HDMI receiver chips and HDMI transmitter chips) available from vendors like Analog Devices®, NXP®, Texas Instruments®, etc. A typical configuration scheme for a one input port and one output port HDMI transceiver is shown in configuration scheme 200 of FIG. 2. Configuration scheme 200 includes repeater 104 of repeater configuration 100 of FIG. 1. Configuration scheme 200 of FIG. 2 can be distinctly broken into three sub-schemes: a configuration scheme 202, a signal conditioning scheme 204, and a connector scheme 206. Configuration scheme 202 includes an HDMI transceiver 208 that includes an input component 210 and an output component 212. Signal conditioning scheme 204 includes a conditioning input circuit 214 and a conditioning output circuit 216. Connector scheme 206 includes a first HDMI connector 218 and a second HDMI connector 220.

As illustrated, first HDMI connector 218 is an input that is wired to the input portion of HDMI transceiver 208 (i.e., through conditioning input circuit 214 to input component 210). Second HDMI connector 220 is an output that is wired to the output portion of HDMI transceiver 208 (i.e., through conditioning output circuit 216 from output component 212). Thus, it may clearly be seen that signal conditioning scheme 204 and configuration scheme 202 have been designed to accept either input or output HDMI signals. For instance, in normal operation, signal conditioning for differential data lines on both input and output ports is similar, however, hot-plug detect signals and +5V lines for HDMI connectors have to be terminated differently. Therefore, the entire architecture of repeater 104 according to configuration scheme 200 is rigid and incapable of dynamic adaptation to different types of input and output connections.

BRIEF SUMMARY

Methods, systems, and apparatuses are described for auto-detection and adaptive configuration of high-definition multimedia interface (HDMI) ports, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
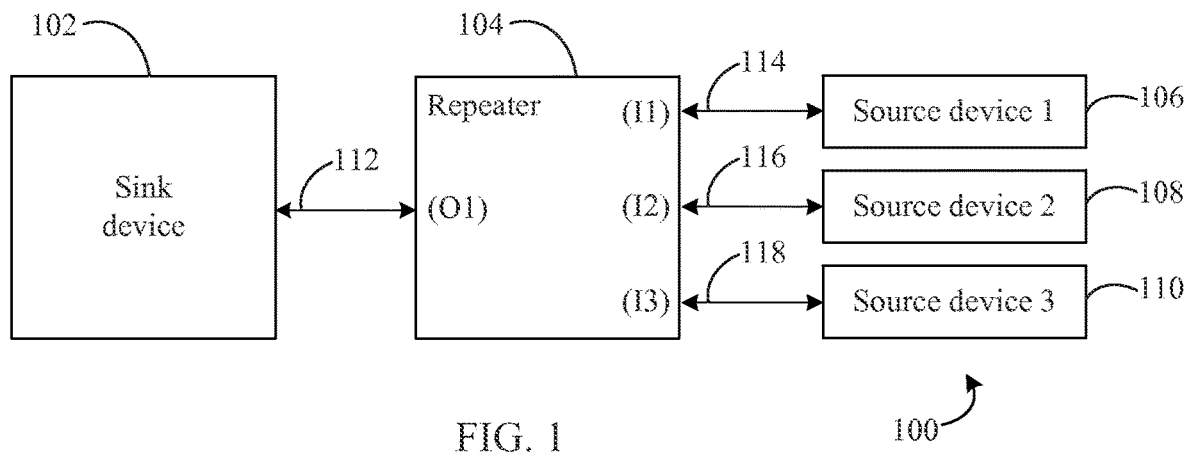
FIG. 1 is a system diagram of a typical HDMI repeater implementation.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and each embodiment may be eligible for inclusion within multiple different sections or subsections. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

In embodiments, techniques for auto-detection and adaptive configurations of high-definition multimedia interface (HDMI) ports are described. Embodiments described herein alleviate and/or eliminate the above-noted problems by making HDMI signaling more flexible, convenient, and "user friendly." For instance, the described techniques and embodiments include connectors that are not pre-designated or pre-defined for any specific input or output thus eliminating the need for dedicated input or output ports in HDMI repeaters, and reducing the complexity and enhancing the ease of the repeater setup. The example techniques and embodiments described herein may be adapted to various types of systems and devices, such as HDMI repeaters or other types of electronic devices. By way of example but without limitation, the embodiments herein may also be adapted to communication devices (e.g., cellular and smart phones, etc.), computers/computing devices (laptops, tablets, desktops, etc.), computing systems, other electronic devices such as gaming consoles, other home electronics and entertainment devices, and/or the like, that may include HDMI input/output ports into which HDMI device are connected. It is contemplated herein that in various embodiments and with respect to the illustrated figures of this disclosure, one or more components described and/or shown may not be included and that additional components may be included.

As noted above, a user's enjoyment and experience, e.g., for home theater, may be lessened when improper HDMI connections are made between HDMI sources and sinks. The described techniques and embodiments include an interface scheme in which a repeater device is able to detect the type or operating mode of a device (i.e., a source or a sink) connected to the HDMI port and automatically configure the internal circuits to support either a source or a sink.

Figure 3:
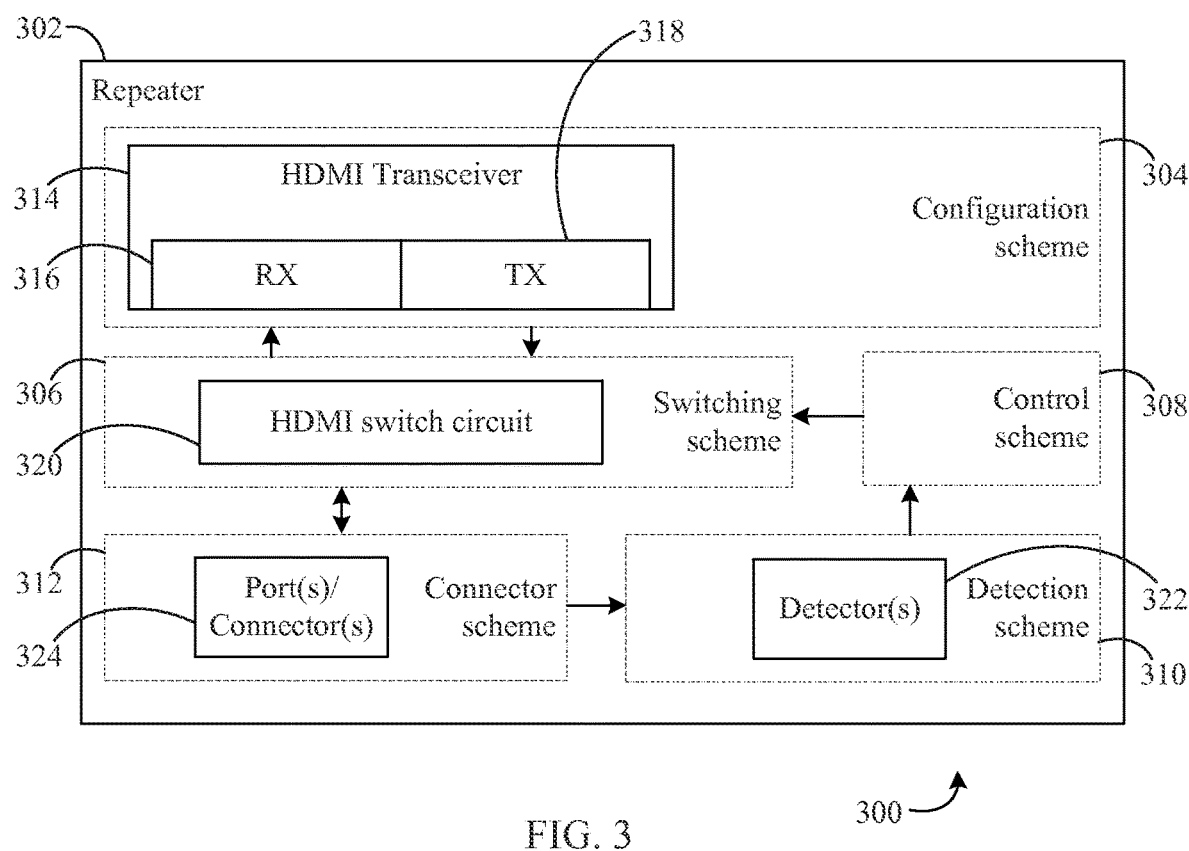
FIG. 3 is a block diagram of a portion of an HDMI repeater with auto-detection and adaptive configuration with scheme levels, according to an exemplary embodiment.

For example, FIG. 3 is a block diagram of a detection and control configuration scheme 300. In embodiments, detection and control configuration scheme 300 may be implemented in an HDMI repeater such as a repeater 302. Repeater 302 includes a number of sub-schemes according to embodiments: a configuration scheme 304, a switching scheme 306, a control scheme 308, a detection scheme 310, and a connector scheme 312. While not shown for illustrative clarity, a typical signal conditioning scheme may be retained in detection and control configuration scheme 300 to meet the strict compliance requirements of HDMI standards. According to various embodiments, the sub-schemes shown in detection and control configuration scheme 300 may be combined with each other, separated into multiple components, etc.

Figure 2:
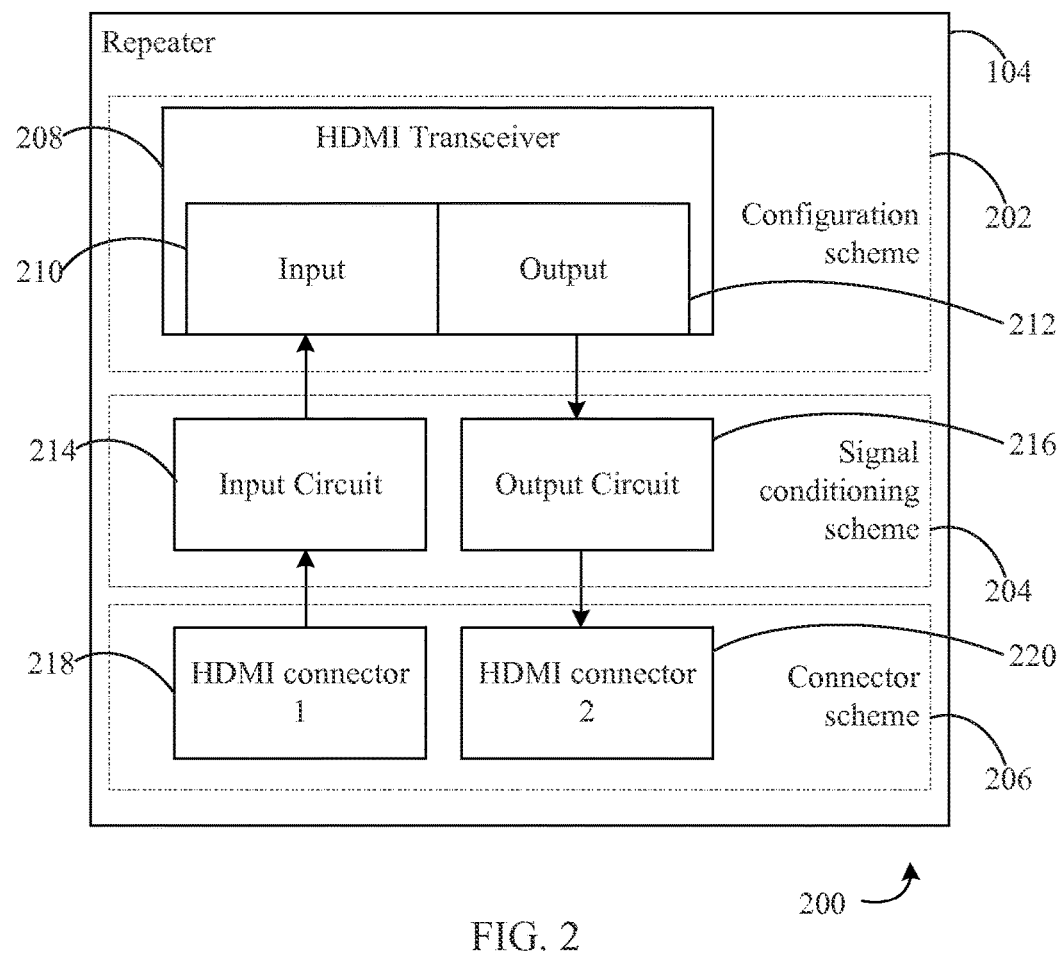
FIG. 2 is a block diagram of a typical HDMI repeater transceiver at a scheme level.

In embodiments, configuration scheme 304, connector scheme 312, and the signal conditioning scheme (not shown) may be similarly configured as in a typical HDMI repeater having configuration scheme 200 described with respect to FIG. 2 above with exceptions noted below.

Connector scheme 312 includes a plurality of HDMI connectors (or ports) 324. HDMI connectors 324 are configured to accept HDMI connections (e.g., via cables) from HDMI enabled devices, such as HDMI sinks and HDMI sources. According to embodiments, any HDMI connector of HDMI connectors 324 may accept a sink or a source.

Configuration scheme 304 includes an HDMI transceiver 314 that includes an input component RX 316 and an output component TX 318. HDMI transceiver 314 is configured to receive HDMI signals at input component RX 316 and to transmit HDMI signals from output component TX 318. In other words, HDMI transceiver 314 provides received input signals from source devices as output signals to sink devices, in accordance with the embodiments herein. It is also contemplated herein that one or more of input component RX 316 and/or an output component TX 318 may be included in HDMI transceiver 314 in various embodiments.

Detection scheme 310 may include one or more detectors 322 that are configured to detect indicia of operational modes to determine a type of an HDMI enabled device connected to HDMI connectors 324 (i.e., whether the device is a source or a sink). In embodiments, detectors 322 may be configured to make such a detection/determination based on signals received from HDMI connectors 324.

Control scheme 308 may receive the detected indicia or signals based thereon from detectors 322 and use the received information to control one or more aspects of switching scheme 306, such as one or more switches included therein. In embodiments, control scheme 308 may include logic to adaptively control the one or more aspects of switching scheme 306 (described in further detail below).

Switching scheme 306 includes an HDMI switch circuit 320. HDMI switch circuit 320 is configured to provide switched connections between HDMI connectors 324 and HDMI transceiver 314. That is, HDMI switch circuit 320 may provide a connection between any connector or port of HDMI connectors 324 and any receiver (e.g., input component RX 316) or transmitter (e.g., output component TX 318) of HDMI transceiver 314. HDMI switch circuit 320 may comprise one or more switch circuit portions and may be combined or used in conjunction with other sub-schemes of detection and control configuration scheme 300.

In detection and control configuration scheme 300, there is no need to pre-define the function of any connector of HDMI connectors 324. That is, HDMI connectors 324 can be configured either as inputs or outputs. Additionally, detectors 322 are configured to detect the type of device (i.e., source or sink) connected to an HDMI port of HDMI connectors 324 and provide this information as input to control scheme 308 which may then issue appropriate commands to HDMI switch circuit 320 to either connect to input component RX 316 or output component TX 318 of HDMI transceiver 314. Thus, the same HDMI connector can act as an input or an output depending on which type of HDMI device is connected and considerably enhance the convenience of an HDMI repeater interface process.

Accordingly, the techniques and embodiments described herein provide for improvements in auto-detection and adaptive configuration of HDMI ports, as described above.

For instance, methods, systems, devices, and apparatuses are provided for auto-detection and adaptive configuration of HDMI ports. An HDMI circuit in accordance with an example aspect is described. The HDMI circuit includes a first detection component, a second detection component, a control component, and a switching circuit. The first detection component is configured to receive a signal from a first HDMI connector and detect from the signal from the first HDMI connector first indicia of an operational mode of a first HDMI device connected to the first HDMI connector. The second detection component is configured to receive a signal from a second HDMI connector and detect from the signal from the second HDMI connector second indicia of an operational mode of a second HDMI device connected to the second HDMI connector. The control component is configured to receive the first indicia and second indicia, and provide one or more configuration control signals based on the first indicia or the second indicia. The switching circuit is configured to receive the one or more configuration control signals, and provide a connection, based on the one or more configuration control signals, between either of the first and the second HDMI connectors and either of a receive circuit or a transmit circuit of a transceiver that is configured to receive HDMI signals at the receive circuit and to transmit HDMI signals from the transmit circuit.

A method in accordance with another example aspect is described. The method is for adaptation of an HDMI port. The method includes detecting a mode of an HDMI device that is connected to the HDMI port, the mode being at least one of an HDMI source mode or an HDMI sink mode, and providing a control signal to a switching component based on the mode. The method also includes activating the switching component according to the control signal, and dynamically configuring the HDMI port according to the detected mode.

A system in accordance with another example aspect is described. The system includes an HDMI mode detection circuit that comprises a first detection switch with a first terminal electrically coupled to a first pin of an HDMI port and a second terminal, a first mode detection node electrically coupled to the second terminal, and a second mode detection node electrically coupled to a second pin the HDMI port. The first detection switch is configured to receive a first HDMI signal from the HDMI port via the first pin, and receive a first control signal. The first detection switch is also configured to activate in response to receiving the first control signal, and provide an indication of a first HDMI mode at the first mode detection node based at least in part on the first HDMI signal. The second mode detection node is configured to receive a second HDMI signal from the HDMI port via the second pin, and provide an indication of a second HDMI mode based on a voltage value at the second pin.

Various example embodiments are described in the following subsections. In particular, example detection and configuration embodiments are described, followed by a description of further example embodiments and advantages. Finally, some concluding remarks are provided. It is noted that the division of the following description generally into subsections is provided for ease of illustration, and it is to be understood that any type of embodiment may be described in any subsection.

III. Example Detection and Configuration Embodiments

Systems and devices may be configured in various ways according to the embodiments and techniques described herein. In embodiments, an HDMI repeater or other device with HDMI connectors/ports may be connected to an HDMI enabled device. The HDMI repeater or other device may be configured, according to embodiments, to automatically detect if the HDMI enabled device that is connected is operating as a source device or a sink device (i.e., which type of device is connected), and to dynamically configure the connector or port accordingly.

Figure 4:
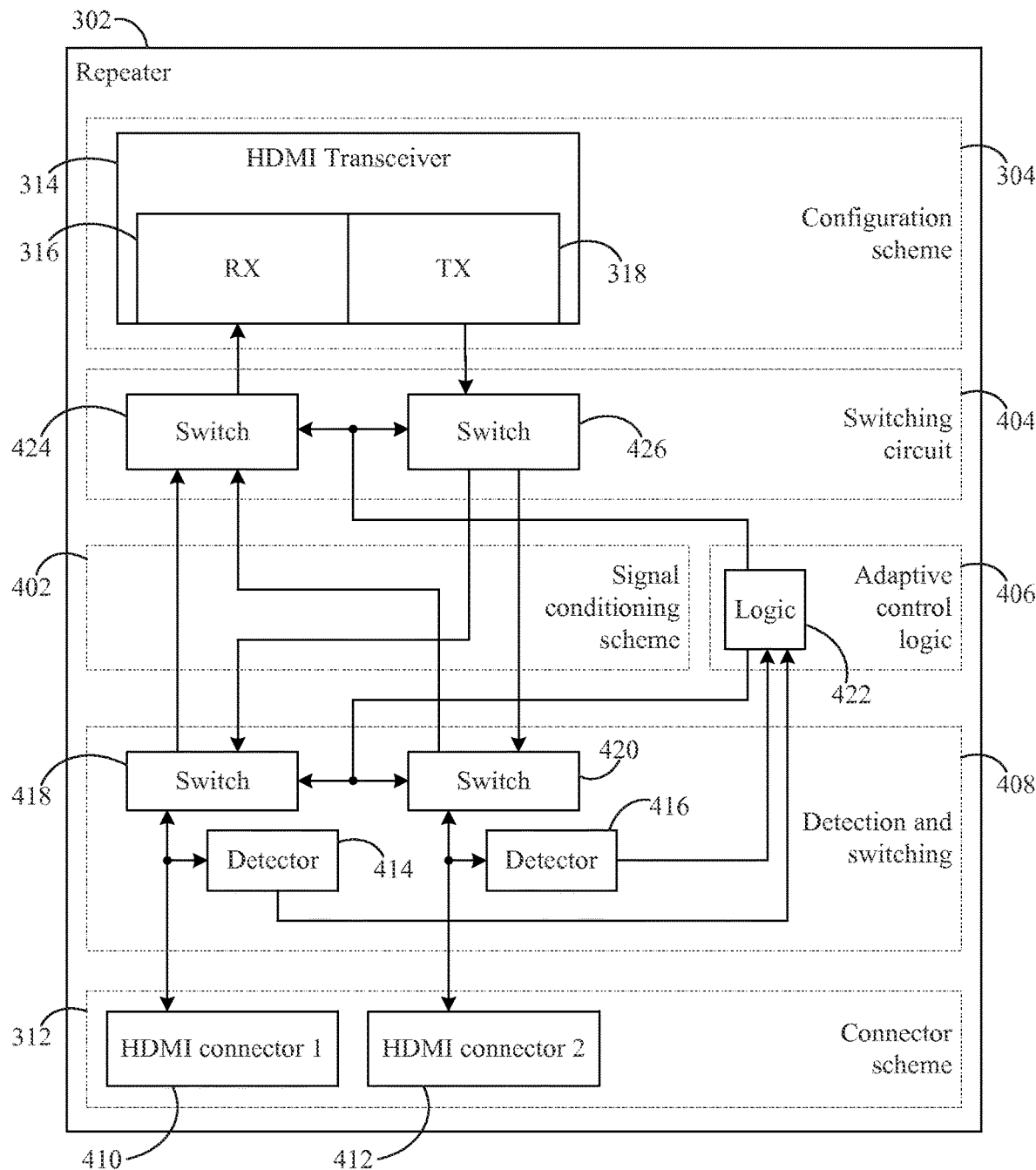
FIG. 4 is a block and schematic diagram of a portion of the HDMI repeater of FIG. 3, according to an exemplary embodiment.

FIG. 4 is a block diagram of a detection and control configuration scheme 400. In embodiments, detection and control configuration scheme 400 may be a further embodiment of detection and control configuration scheme 300. For instance, detection and control configuration scheme 400, as shown, includes repeater 302, configuration scheme 304 (with HDMI transceiver 314, input component RX 316, and output component TX 318), connector scheme 312 (having a first HDMI connector 410 and a second HDMI connector 412), and a signal conditioning scheme shown as signal conditioning scheme 402.

According to the illustrated embodiment, rather than switching scheme 306, control scheme 308, and detection scheme 310 of detection and control configuration scheme 300, detection and control configuration scheme 400 includes a switching circuit 404, adaptive control logic 406, and detection and switching circuit 408.

Detection and switching circuit 408 includes detector and switching components. For example, as shown, detection and switching circuit 408 includes a detector 414 and a detector 416 (which may be further embodiments of detectors 322 of FIG. 3), as well as a switch 418 and a switch 420. Adaptive control logic 406 includes a logic component 422, and switching circuit 404 includes a switch 424 and a switch 426. Detector 414 and switch 418 are each configured to receive one or more signals from first HDMI connector 410, and detector 416 and switch 420 are each configured to receive one or more signals from second HDMI connector 412.

Figure 5:
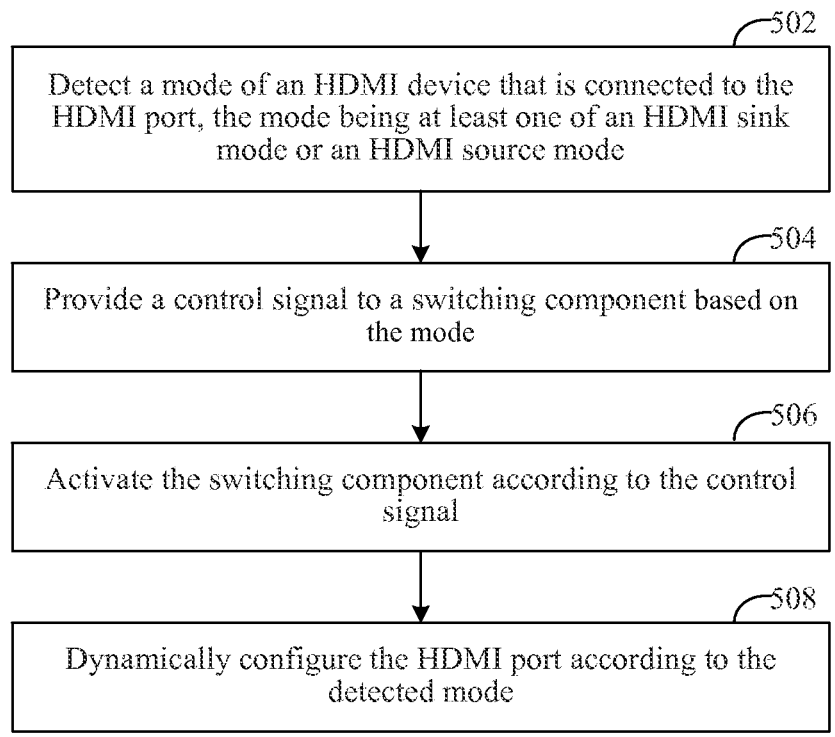
FIG. 5 is a flowchart for auto-detection and adaptive configuration, according to an exemplary embodiment.

Turning now to FIG. 5, a flowchart 500 is shown according to which various embodiments, such as illustrated repeater 302, may operate. For instance, a mode of an HDMI device that is connected to the HDMI port is detected, the mode being at least one of an HDMI sink mode or an HDMI source mode (502). Detector 414 and detector 416 are each configured to detect indicia of operational modes to determine a type of an HDMI enabled device connected to first HDMI connector 410 and second HDMI connector 412 respectively (i.e., whether the devices are a source or a sink). In embodiments, detector 414 and detector 416 may be configured to make such a detection/determination based on signals received from first HDMI connector 410 and second HDMI connector 412, as described in further detail herein.

Continuing with flowchart 500, a control signal is provided to a switching component based on the mode (504). For example, logic component 422 may receive the detected indicia, or signals based thereon, from detector 414 and detector 416 (e.g., as in (502)), and use the received information to generate and provide a control signal to control one or more operational aspects of switch 418, switch 420, switch 424, and switch 426. In embodiments, logic component 422 adaptively controls the illustrated switches based on the indication of the mode. That is, a control signal may be provided to one or more of switch 418, switch 420, switch 424, and switch 426 in order to provide a connection between first HDMI connector 410 or second HDMI connector 412 and input component RX 316 or output component TX 318 based on whether a connected device is a sink or a source.

Referring again to flowchart 500, the switching component is activated according to the control signal (506). For instance, one or more of switch 418, switch 420, switch 424, and switch 426 may be activated by the control signal provided by logic component 422 as in (504). As noted above, switches may be controlled and activated to provide connections between first HDMI connector 410 or second HDMI connector 412 and input component RX 316 or output component TX 318 based on whether a connected device is a sink or a source. The activated switching components according to (506) provide for the desired connection to HDMI transceiver 314 for a source or sink device plugged into first HDMI connector 410 or second HDMI connector 412. Put another way, a sink device on an HDMI connector may cause a control signal to activate switching components to connect the HDMI connector to output component TX 318, while a source device on an HDMI connector may cause a control signal to activate switching components to connect the HDMI connector to input component RX 316.

Flowchart 500 ends when the HDMI port is dynamically configured according to the detected mode (508). For instance, subsequent to the switching component being activated in (506), a connection between the HDMI port or connector (e.g., 410, 412) and the desired portion of HDMI transceiver 314 is established, and the HDMI port is appropriately configured at HDMI transceiver 314.

Figure 6:
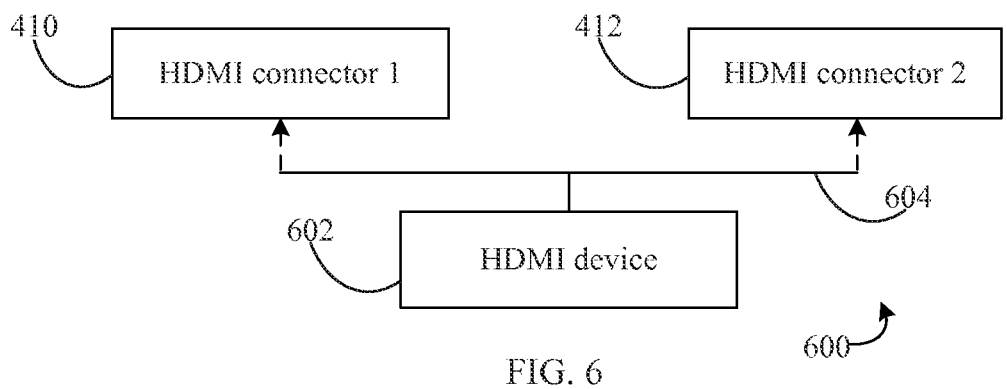
FIG. 6 is a block diagram of a portion of a multi-port implementation of the HDMI repeater of FIG. 4, according to an exemplary embodiment.
Figure 7:
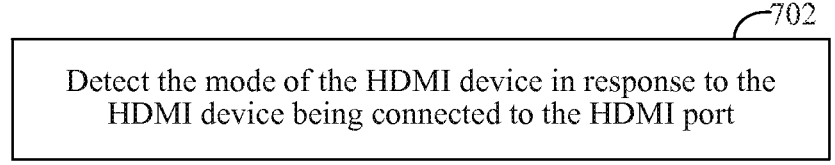
FIG. 7 is a block diagram of a portion of a multi-port implementation of the HDMI repeater of FIG. 4, according to an exemplary embodiment.

Referring now to FIGS. 6 and 7, a block diagram of an example connection 600 to an HDMI connector is shown in FIG. 6, and a flowchart 700 for detecting the mode of an HDMI device is shown in FIG. 7.

Example connection 600 of FIG. 6 shows that an HDMI device 602 may be connected via plug-in 604 to first HDMI connector 410 or second HDMI connector 412 described with respect to FIG. 4. According to embodiments, HDMI device 602 may be a source device or a sink device. The mode of the HDMI device is detected in response to the HDMI device being connected to the HDMI port (702). For instance, responsive to HDMI device 602 being connected via plug-in 604 to first HDMI connector 410 or second HDMI connector 412, detector 414 or detector 416 may respectively detect the mode of operation (or type) of HDMI device 602 as sink or source.

As an illustrative, exemplary embodiment, consider a scenario in which first HDMI connector 410 is to be connected to an HDMI source device such as HDMI device 602. First, the HDMI cable coming from the source (e.g., a Blu-ray® player) is connected to first HDMI connector 410. Next, the source device and repeater 302 are powered on. Detector 414 detects that a source has been connected and provides this information (e.g., as one or more bits or as data in part of a communication protocol) to logic component 422 which provides a control signal (i.e., issues a command) to switch 418 and to switch 424 to configure a connection to input component RX 316. Then, based on the control signal provided, switch 418 and switch 424 connect to input component RX 316 and first HDMI connector 410 is connected to the receiver of HDMI transceiver 314 while output component TX 318 is disconnected from first HDMI connector 410.

Accordingly, first HDMI connector 410 is dynamically configured as an HDMI input port.

As a further illustrative, exemplary embodiment, consider a scenario in which first HDMI connector 410 is to be connected to an HDMI sink device such as HDMI device 602. First, the HDMI cable coming from the sink (e.g. a TV or HDTV) is connected to first HDMI connector 410. Next, the sink device and repeater 302 are powered on. Detector 414 detects that a sink has been connected and provides this information (e.g., as one or more bits or as data in part of a communication protocol) to logic component 422 which provides a control signal (i.e., issues a command to switch 418 and to switch 426 to configure a connection to output component TX 318. Then, based on the control signal provided, switch 418 and switch 426 connect to output component TX 318 and first HDMI connector 410 is connected to the transmitter of HDMI transceiver 314 while input component RX 316 is disconnected from first HDMI connector 410.

Accordingly, first HDMI connector 410 is dynamically configured as an HDMI output port.

It should be noted that second HDMI connector 412 may be similarly configured as an input port via switch 420 and switch 424, or may be similarly configured as an output port via switch 420 and switch 426, according to embodiments.

Through these described example scenarios, it can be seen that the same HDMI connector (e.g., first HDMI connector 410 in the examples above) is capable of being dynamically configured as either an input HDMI port/connector or an output HDMI port/connector. Furthermore, the described techniques and embodiments may be fully compliant with HDMI certification requirements as the signal conditioning circuitry is different for each input or output configuration, and may be dynamically adapted accordingly. The above-described techniques and embodiments can be replicated for multiple input/output repeater configurations, thus providing more convenience and flexibility to the end user.

It is contemplated that embodiments described herein with respect to auto-detection and adaptive configurations of HDMI ports are not so limited, and that other types and aspects of auto-detection and adaptive configurations of HDMI ports may be utilized in such embodiments, as would be understood by a person of skill in the relevant art(s) having the benefit of this disclosure.

Figure 8:
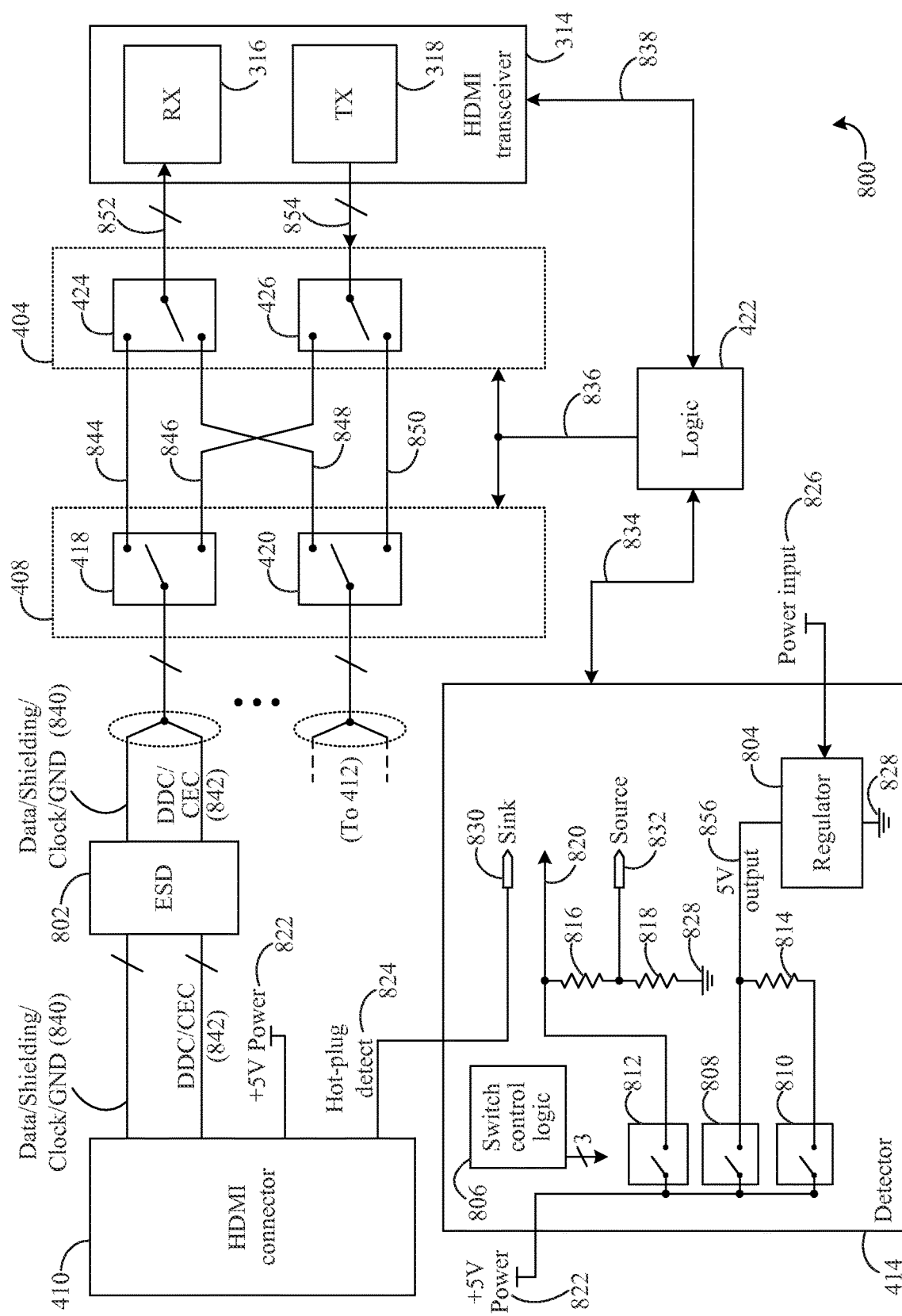
FIG. 8 is a block and circuit diagram of a portion of a multi-port implementation of the HDMI repeater of FIG. 4, according to an exemplary embodiment.

Turning now to FIG. 8, an example auto-detection and adaptive HDMI port configuration 800 is shown. Auto-detection and adaptive HDMI port configuration 800 may be included in an HDMI repeater such as repeater 302, and may be a further embodiment of detection and control configuration scheme 400 of FIG. 4. For instance, auto-detection and adaptive HDMI port configuration 800 includes HDMI transceiver 314 (having input component RX 316 and output component TX 318), first HDMI connector 410, detector 414, switch 418, and switch 420 of detection and switching circuit 408, switch 422 and switch 424 of switching circuit 404, logic component 422, and a signal conditioning scheme (not shown for illustrative clarity). It should be noted that for ease of illustration, detector 414 is shown outside of switching circuit 404 in the embodiment illustrated in FIG. 8.

Auto-detection and adaptive HDMI port configuration 800 also includes an electrostatic discharge (ESD) circuit 802 between first HDMI connector 410 and switch 418 that is configured to protect against ESD. For instance, signals carried by HDMI signal connectors 840 (e.g., HDMI data, shielding, clock, ground, etc.), as well as signals carried by HDMI signal connectors 842 (e.g., display data channel (DDC), consumer electronics control (CEC), etc.), may be routed through ESD circuit 802 before being provided further into auto-detection and adaptive HDMI port configuration 800 (e.g., to switch 418).

It should be noted that second HDMI connector 412, detector 416, and their corresponding ESD circuit are not shown for ease of illustration in FIG. 8, however, their inclusion in embodiments is fully contemplated.

As noted herein, according to the described embodiments and techniques, a device connected to an HDMI port may be identified as a source or a sink. Detector 414 is configured to determine indicia of such operating modes (or types) of connected devices based on signals of connector pins for an HDMI "Type A" connector. As previously noted, pin/signal terminations may be different for HDMI input (i.e., receive) and HDMI output (i.e., transmit) ports/connectors. For instance, three pins of an HDMI connector, such as first HDMI connector 410, may require special handling, namely: utility/ARC (auto return channel), +5V power, and hot-plug detect. Of these three pins, the utility/ARC pin is supported by devices that support ARC which is typically not prevalent, and therefore according to some embodiments, +5V power and hot-plug detect are used to provide definitive solutions for detection and identification of connected HDMI devices.

The HDMI standard specification for a source device requires that it provide +5V to drive the HDMI cable and sink device combination. Likewise, a sink device is required to provide a voltage on the hot-plug detect pin the moment a source device is connected. It is normally recommended to use the +5V from the source device to power this hot-plug detect line. In accordance with an embodiment, an algorithm uses a combination of these two signals to identify if the HDMI device connected is a source or a sink.

Referring back to FIG. 8, detector 404 is configured to detect a voltage on a hot-plug detect pin 824 of an HDMI connector, such as first HDMI connector 410, and to detect a voltage on a +5V power pin 822 of the HDMI connector.

Detector 404 includes three switches: switch 808, switch 810, and switch 812 (e.g., detection switch components). These switches connect +5V power pin 822 on first HDMI connector 410 to an onboard linear regulator 804, such a low drop-out (LDO) regulator, that generates a +5V output, based on a power input 826, on a connector 856 through a 1KΩ resistive element 814 (switch 810, a second regulator detection switch), to the +5V output of linear regulator 804 without an additional resistive element (switch 808, a first regulator detection switch), and to HDMI sink port connections 820 (e.g., for hot-plug detection) (switch 812, a source detect switch), respectively. +5V power pin 822 is used for +5V detection and for powering other circuits like hot-plug detect signals as would be understood by one of skill in the relevant art(s) having the benefit of this disclosure.

Figure 9:
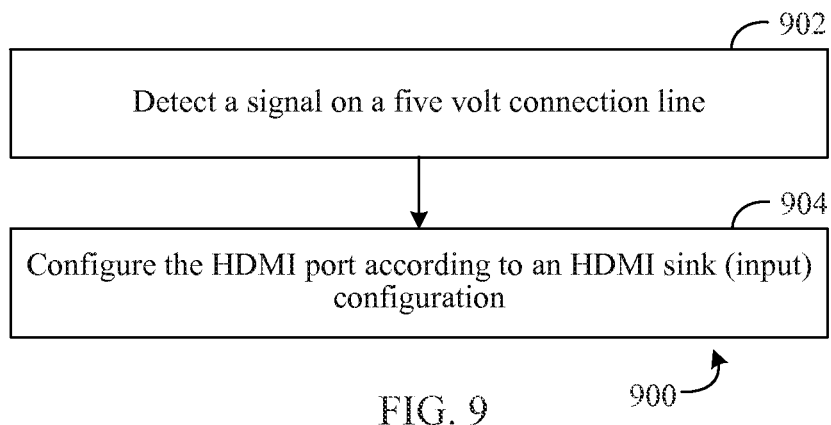
FIG. 9 is a flowchart of a method for automatic detection of HDMI device modes, according to an exemplary embodiment.

Turning now to FIG. 9, a flowchart 900 is provided for auto-detection and configuration of HDMI ports. A signal is detected on a five volt connection line (902). When a signal on a 5V connection line via +5V power pin 822 is provided to HDMI sink port connections 820, a voltage sensed across a resistor divider comprising a resistive component 816 (e.g., 1KΩ) and a resistive component 818 (e.g., 1KΩ), to a GND 828, at a mode detection node 832 indicates a source device has been connected.

Figure 10:
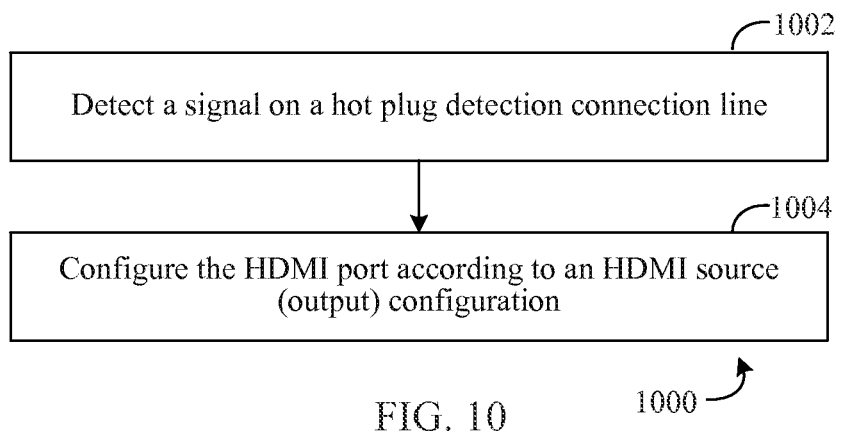
FIG. 10 is a flowchart of a method for automatic detection of HDMI device modes, according to an exemplary embodiment.

Turning now to FIG. 10, a flowchart 1000 is provided for auto-detection and configuration of HDMI ports. A signal is detected on a hot-plug detection connection line (1002). The hot-plug detect pin 824 on first HDMI connector 410 is used to provide the voltage (e.g., +5V) on the hot-plug connection line in the HDMI cable for a connected device. This voltage is sensed at a mode detection node 830 via hot-plug detect pin 824 to determine if the connected device is a sink. As described above, a sink device is required to provide a voltage (e.g., +5V) on hot-plug detect pin 824 the moment a source device is connected thereto, thus a voltage provided at mode detection node 830 indicates a sink device has been connected.

Signals and/or information from mode detection node 830 and mode detection node 832 are provided to logic component 422 via a connector 834. Logic component 422 is configured to process the signals/information from mode detection node 830 and mode detection node 832 indicative of the type or operating mode of the connected HDMI device, and to provide configuration commands to switch 418, switch 420, switch 424, and switch 426 via a connector 836. Logic component 422 may also be configured to provide the signals/information to HDMI transceiver 314 via a connector 838 to configure HDMI connectors/ports as inputs or outputs, as described herein.

Referring again to FIGS. 9 and 10, the HDMI port is configured according to an HDMI sink (input) configuration (904) when a signal is detected on the five volt connection line (as in 902), and the HDMI port is configured according to an HDMI source (output) configuration (1004) when a signal is detected on the hot-plug detection connection line (as in 1002). As described above, the HDMI configuration switches described herein may be configured by commands provided from logic component 422 to provide connections between HDMI connectors/ports and either of input component RX 316 or output component TX 318 of HDMI transceiver 314. Configuring an HDMI port as a sink (904) provides a connection to input component RX 316, while configuring an HDMI port as a source (1004) provides a connection to output component TX 318.

Switch 418, switch 420, switch 424, and switch 426 may be implemented using a variety of switching elements such as general purpose switches commonly used in motherboards requiring DisplayPort, HDMI, PCI Express, and USB switching/multiplexing (e.g., CBTL06GP213 from NXP®). Any types of switches may be used (e.g., single-pole, double-throw as illustrated in FIG. 8) as long as the switches are configurable to connect a signal coming from the HDMI connector (e.g., first HDMI connector 410) to either of input component RX 316 or output component TX 318 of HDMI transceiver 314.

For instance, HDMI signal connectors 840/842 from first HDMI connector 410 may be provided to switch 418. Switch 418 may provide a connection from HDMI signal connectors 840/842 to either of a connector 844 or a connector 846. Connector 844 may connect to a connector 852 via switch 424 and then to input component RX 316. In such a configuration, first HDMI connector 410 is configured as an input and will provide HDMI data and information to HDMI transceiver 314 from a connected HDMI source device. Connector 846 may connect to a connector 854 via switch 426 and then to output component TX 318. In such a configuration, first HDMI connector 410 is configured as an output and will receive HDMI data and information from HDMI transceiver 314 to be provided to a connected HDMI sink device.

Second HDMI connector 412 (not shown) and its connection via switch 420 may be similarly configured as first HDMI connector 410. For example, switch 420 may connect to either of a connector 848 to switch 424 and then to connector 852, or a connector 850 to switch 426 and then to connector 854.

According to embodiments, the switches are also configured to be turned OFF, so that no signals pass on through the switches, as discussed in further detail below.

It should be noted that various components described (e.g., resistors, switches, etc.) are exemplary in nature, and that other components performing similar or the same functions may be used instead, according to embodiments. It also should be noted that resistance values are exemplary and that other resistance values are contemplated in the embodiments herein.

Figure 11:
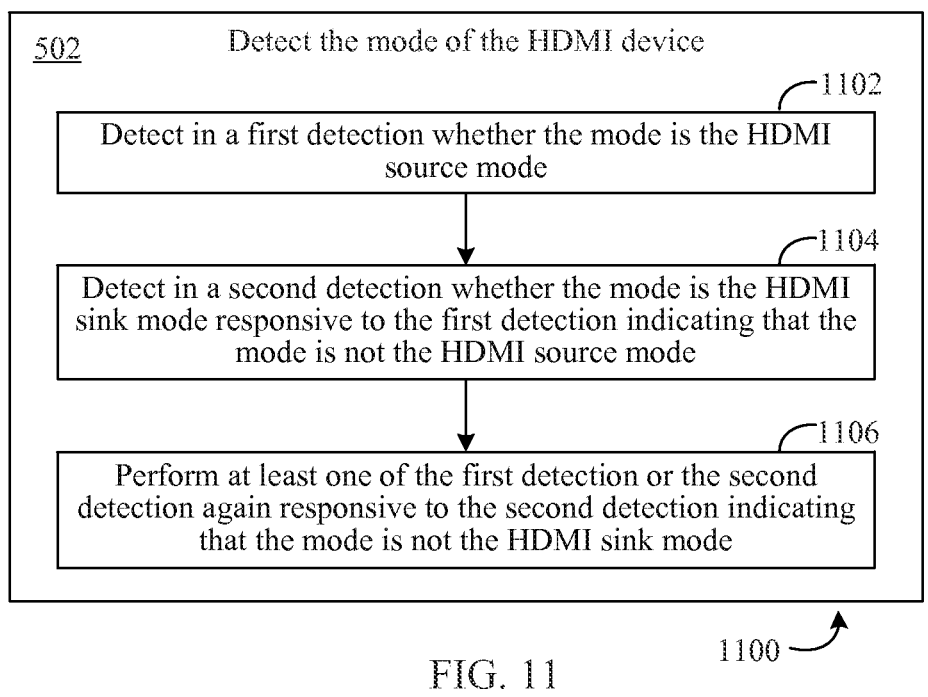
FIG. 11 is a flowchart of a method for automatic detection of HDMI device modes, according to an exemplary embodiment.

FIG. 11 is a flowchart 1100 for detecting the mode of an HDMI device. For example, according to some embodiments an initial detection of an HDMI device mode of operation or type may fail due to lack of proper connection, HDMI device issues or irregularities, etc. Flowchart 1100 provides a technique to repeat detection attempts after a detection failure. Flowchart 1100 may be a further embodiment of (502) of flowchart 500 shown in FIG. 5. Flowchart 1100 is described as follows with respect to FIGS. 8-10.

In a first detection it is detected whether the mode is the HDMI source mode (1102). For example, the first detection may be performed by a detector, such as detector 414, as described in flowchart 900 in (902).

In a second detection it is detected whether the mode is the HDMI sink mode responsive to the first detection indicating that the mode is not the HDMI source mode (1104). For example, the second detection may be performed by a detector, such as detector 414, as described in flowchart 1000 in (1002).

At least one of the first detection or the second detection is performed again responsive to the second detection indicating that the mode is not the HDMI sink mode (1106). For example, the first detection and/or the second detection may be performed again by a detector, such as detector 414, as described in flowchart 900 in (902) and/or in flowchart 1000 in (1002).

Accordingly, detections may be attempted until the first or second detection detects a source mode or a sink mode.

Figure 12:
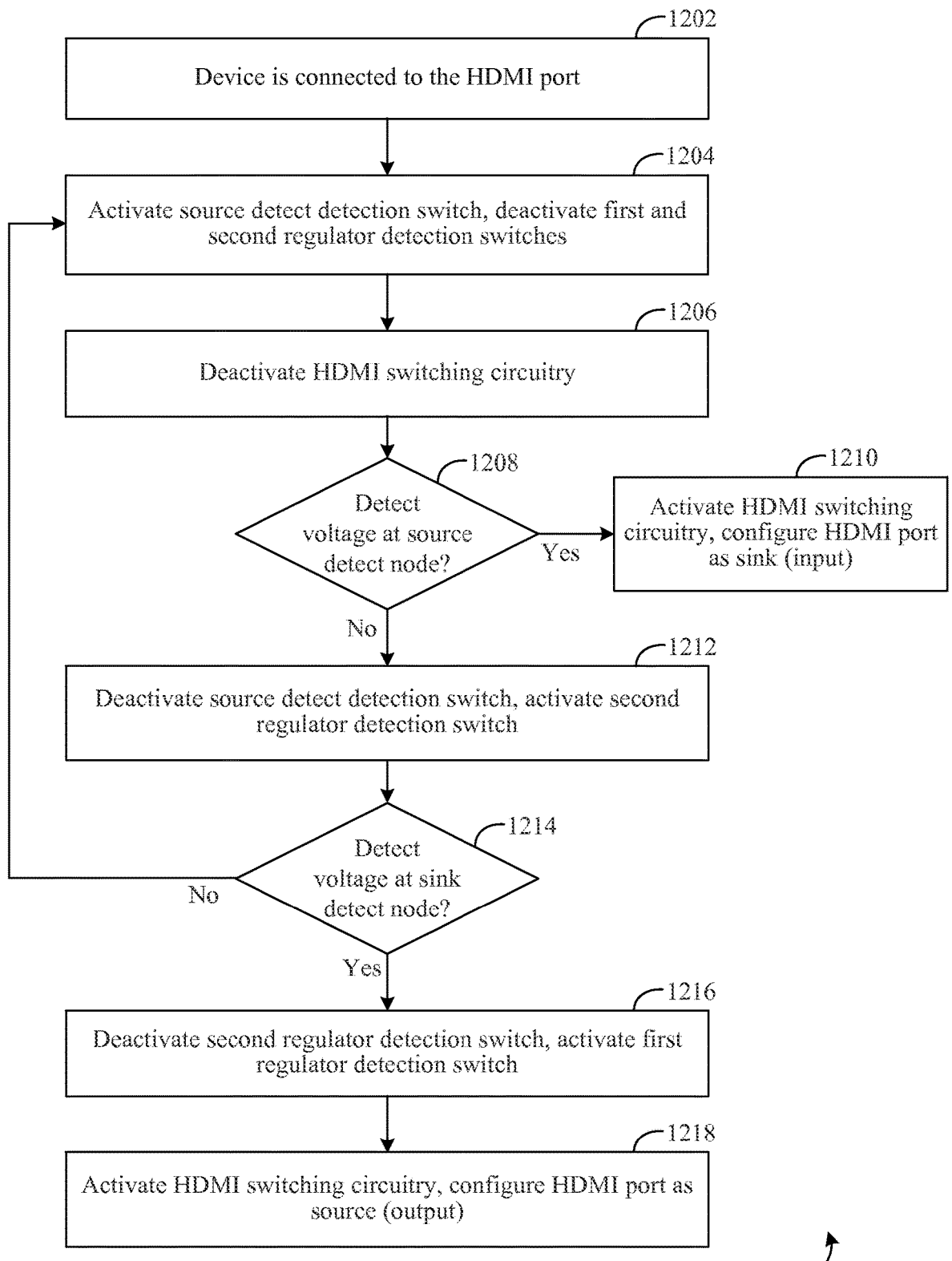
FIG. 12 is a flowchart, of a method for automatic detection of HDMI device modes, according to an exemplary embodiment.

Turning now to FIG. 12, a flowchart 1200 describing exemplary steps for auto-detection and adaptive configuration according to the HDMI repeater 302 of FIG. 4 and/or auto-detection and adaptive HDMI port, configuration 800 of FIG. 8 in the context of repeater 302 is shown. In particular, flowchart 1200 may describe the operation of a detector such as detector 414 or detector 416 according to embodiments. Flowchart 1200 is described as follows.

A device is connected to an HDMI port (1202). For instance, an HDMI device such as HDMI device 602 of FIG. 6 may be connected to an HDMI port or connector such as first HDMI connector 410 or second HDMI connector 412. HDMI device 602 may be a source device or a sink device.

A source detect detection switch is activated, and first and second regulator detection switches are deactivated (1204). For instance, as repeater 302 is turned ON, switch 812 is activated (i.e., closed), and switch 808 and switch 810 are deactivated (i.e., opened). The activation and deactivation may be performed by a detector such as detector 414 using, e.g., switch control logic 806 of FIG. 8.

HDMI switching circuitry is deactivated (1206). That is, the HDMI switching circuitry (e.g., switches 418, 420, 424, 426) are also turned OFF to ensure that only detector 414 circuit is ON. HDMI switching circuitry may be deactivated by logic component 422 or by another controller such as switch control logic 806.

It is determined if a voltage is detected at a source detect node (1208). If the voltage is detected on the source detect line at source mode detect node 832 ("YES"), HDMI switching circuitry is activated, and HDMI port is configured as a sink (input) (1210). That is, if the voltage (e.g., +5V) is detected at source mode detect node 832, the HDMI switching circuitry is powered ON, and the HDMI port or connector (such as first HDMI connector 410 or second HDMI connector 412) is configured as an input port by HDMI transceiver 314 and the appropriate switches as described herein.

If the voltage is not detected ("NO"), the source detect detection switch is deactivated, and the second regulator detection switch is activated (1212). That is, switch 812 is opened (deactivated), and switch 810 is closed (activated).

If a sink device is connected, a hot-plug voltage will be detected. It is determined if a voltage is detected at a sink detect node (1214). If the voltage is detected on the hot-plug detect line at sink mode detect node 830 ("YES"), the second regulator detection switch is deactivated, and the first regulator detection switch is activated (1216). That is, when the voltage at sink mode detect node 830 is detected (e.g., +5V), switch 808 is closed (activated) and switch 810 is opened (deactivated).

HDMI switching circuitry is activated, and the HDMI port is configured as a source (output) (1218). For example, the HDMI switching circuitry is turned ON and the port is configured as an output port by the HDMI transceiver 314 and the appropriate switches. The configuration of switch 810 is to prevent any possible short circuit if two voltage sources come in parallel, according to embodiments.

If the hot-plug voltage is not detected at sink mode detect node 830 (at 1214), then control returns to (1204) described above.

IV. Further Example Embodiments and Advantages

Embodiments with multi HDMI ports (e.g., more than two) using an HDMI transceiver chip, such as HDMI transceiver 314, having a one RX input/one TX output configuration, are also contemplated herein. For instance, by extending the techniques and embodiments described herein (e.g., in FIGS. 4 and 8), a scheme using HDMI transceiver 314 to support four, eight, etc., HDMI ports is provided.

Figure 13:
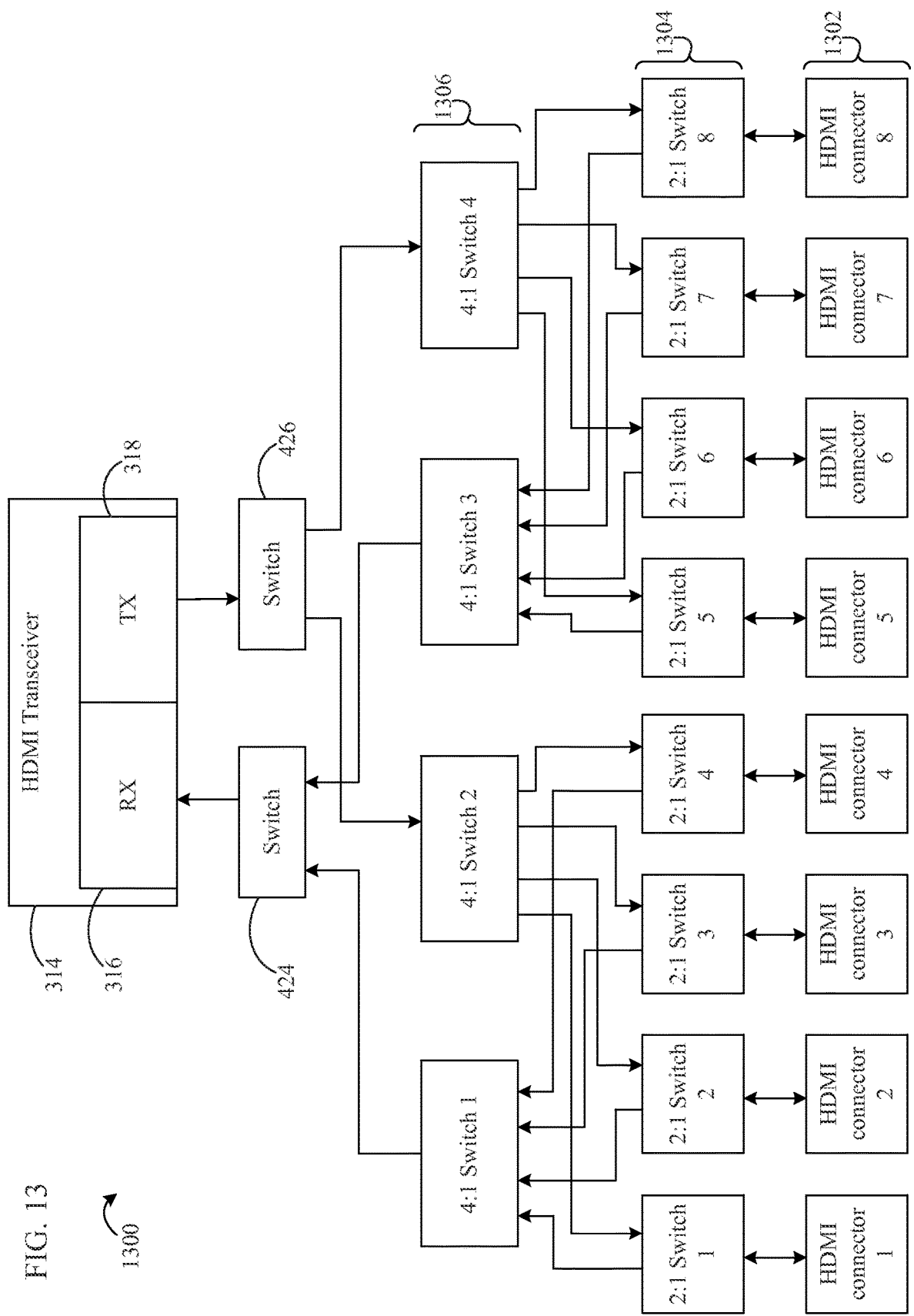
FIG. 13 is a block diagram of a portion of a multi-port implementation of the HDMI repeater of FIGS. 4 and 8, according to an exemplary embodiment.

FIG. 13 is a block diagram of an eight-connector configuration 1300. In an embodiment supporting eight ports/connectors, input component RX 316 and output component TX 318 of HDMI transceiver 314 are each connected in parallel to all eight HDMI ports/connectors 1302 similarly as illustrated in FIG. 4 with a two-connector/port configuration where input component RX 316 and output component TX 318 of HDMI transceiver 314 are each connected in parallel to both first HDMI connector 410 and second HDMI connector 412. In FIG. 4, input component RX 316 has a designated 2-to-1 switch (switch 424), and second HDMI connector 412 has a designated 2-to-1 switch (switch 420). Similarly, first HDMI connector 410 has a designated 2-to-1 switch (switch 418), and output component TX 318 has a designated 2-to-1 switch (switch 426) in FIG. 4. In the extended embodiment described in this section and shown in FIG. 13, each of the eight HDMI ports/connectors 1302 has a corresponding, designated 2-to-1 switch 1304 (i.e., there are eight 2-to-1 switches 1304 for the HDMI ports/connectors 1302 in such an embodiment). In this extended embodiment, the connections between the designated switches 1304 of HDMI ports/connectors 1302 and the designated input component RX 316 switch 424 and output component TX 318 switch 426 are bridged by two 4-to-1 switches 1306 (or one 8-to-1 switch, in some embodiments) for each of switch 424 and switch 426 to provide the parallel, branched connectivity with the eight HDMI ports/connectors 1302. Detection, signal conditioning, and control logic components/elements are not shown for illustrative clarity but are contemplated in embodiments of eight-connector configuration 1300.

The ability described herein to detect an HDMI device connected to a connector/port, as well as its mode, and also the ability to control the connectivity via switching based on such detection, allows for connecting multiple HDMI connectors/ports in parallel.

For example, assume that HDMI connector 1 (of 1302) is connected to an HDMI sink device, and that HDMI connector 2 (of 1302) is connected to an HDMI source device. According to the embodiments and techniques described herein, the sink device is configured to be connected to output component TX 318 via HDMI connector 1 (of 1302) and switch 1 of 1304, switch 2 of 1306, and switch 426, while the source device is configured to be connected to input component RX 316 via HDMI connector 2 (of 1302) and switch 2 of 1304, switch 1 of 1306, and switch 424.

In the preceding example configuration, if another HDMI source device is connected on HDMI connector 3 (of 1302) and issues a command to move to HDMI connector 3 (of 1302), the detection embodiments and techniques described herein are configured to detect the other HDMI source device as a source and enable switch 1 of 1306 take the input of HDMI connector 3 (of 1302) via switch 3 of 1304, while disconnecting HDMI connector 1 (of 1302) from input component RX 316. Likewise multiple HDMI ports may be connected according to eight-connector configuration 1300 to expand HDMI input/output options.

Figure 14:
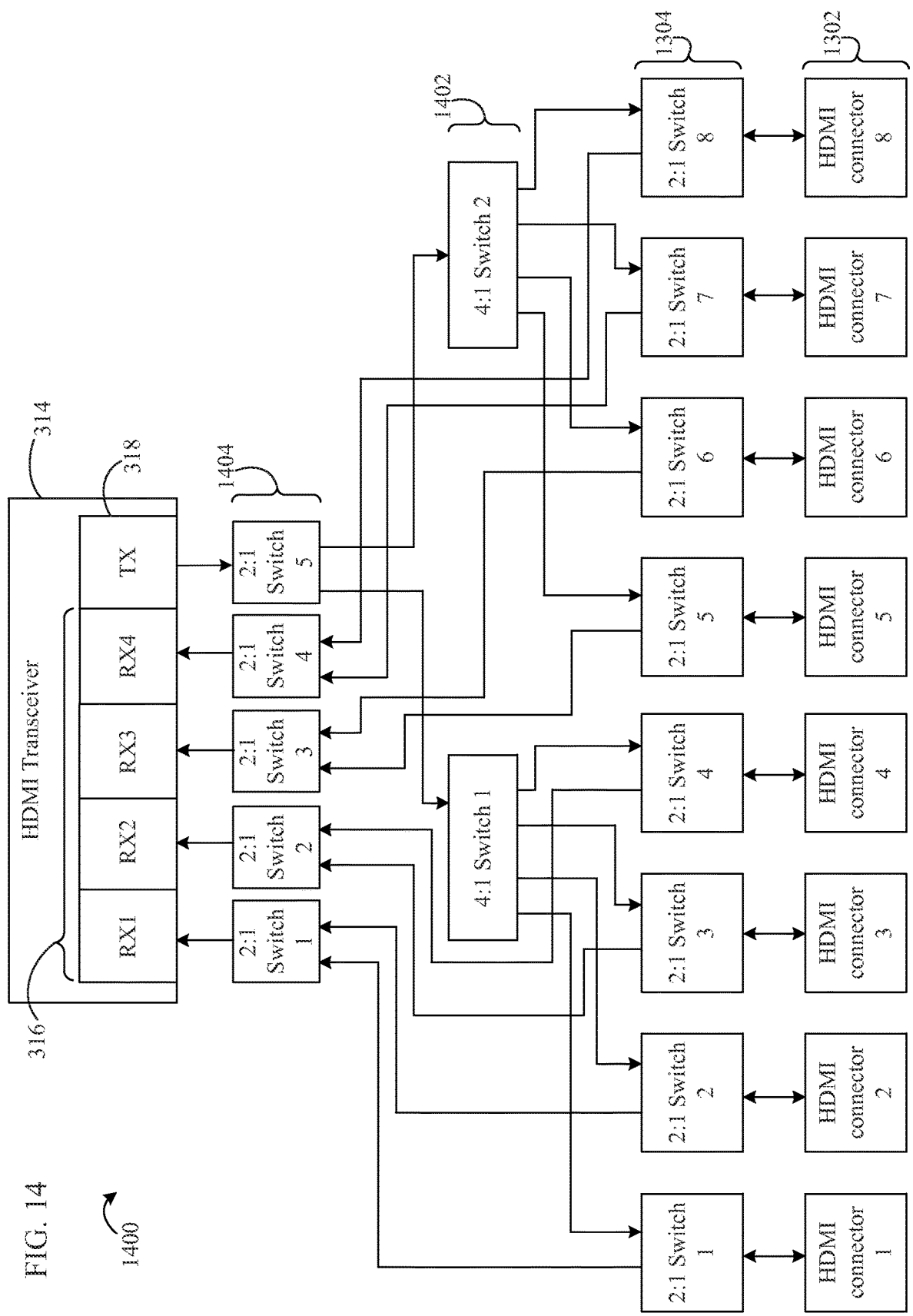
FIG. 14 is a block diagram of a portion of a multi-port implementation of the HDMI repeater of FIGS. 4, 8, and 13, according to an exemplary embodiment.

The extension illustrated in FIG. 13 may also be modified for a configuration having an HDMI transceiver with combinations of multiple receivers and/or transmitters. For example, FIG. 14 is a block diagram of an example multi-receiver configuration 1400. Multi-receiver configuration 1400 includes HDMI transceiver 314 with output component TX 318, and with input component RX 316 comprising four independent sub-receivers: RX1, RX2, RX3, and RX4. According to multi-receiver configuration 1400, output component TX 318 and each independent sub-receiver RX1, RX2, RX3, and RX4 of input component RX 316 has a designated 2-to-1 switch 1404, and output component TX 318 further connects to each of HDMI connectors 1302 via 4-to-1 switches 1402 and 2-to-1 switches 1304.

It should be noted that the switch configurations/options described herein are exemplary in nature and are not to be considered limiting. For example, multiple 2-to-1 switches may be combined as 4-to-1 switches, 8-to-1 switches, etc., and vice versa.

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The auto-detection and adaptive configuration of high-definition multimedia interface (HDMI) ports embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 15:
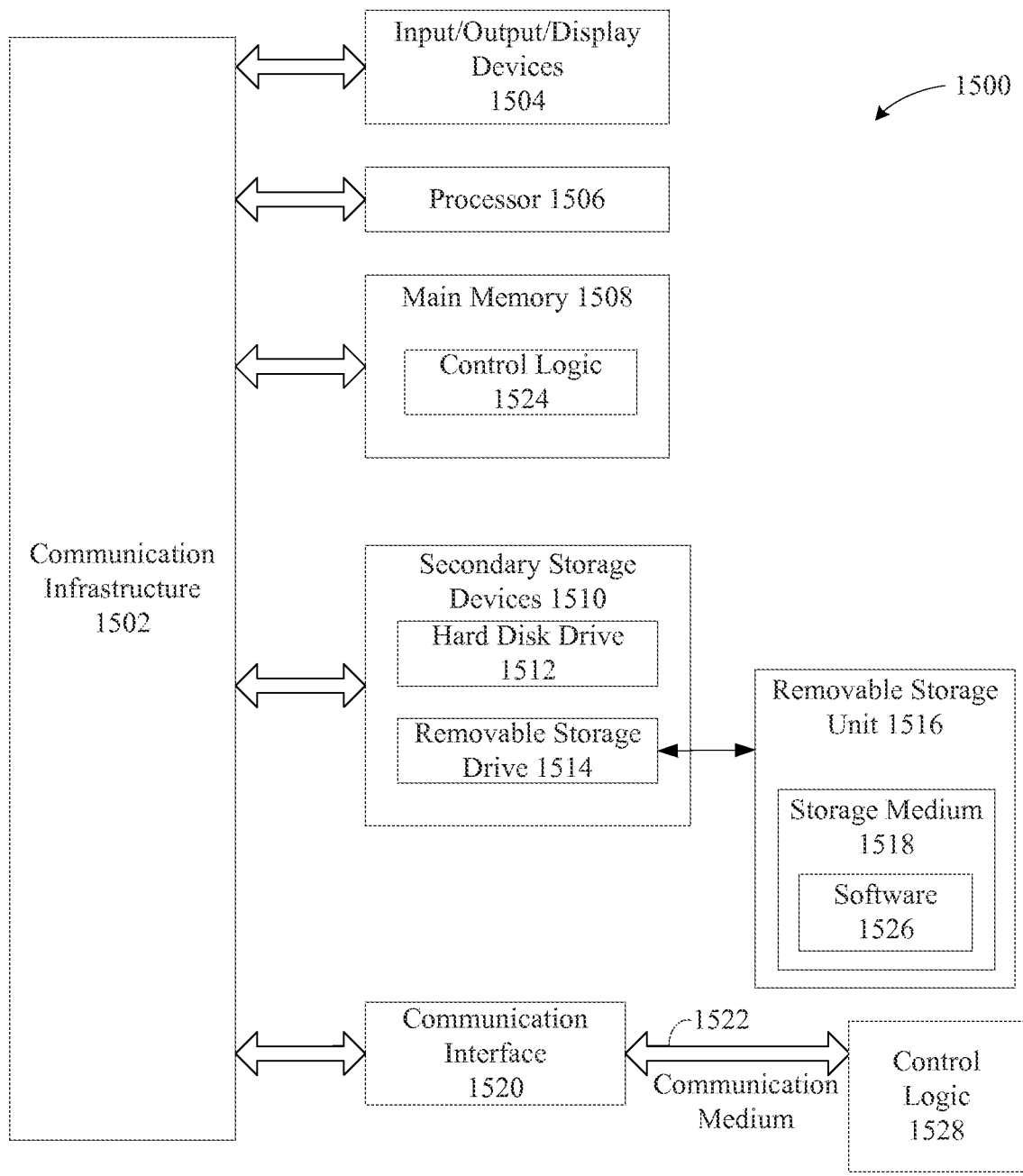
FIG. 15 is a block diagram of a computer system, according to an exemplary embodiment.

The embodiments described herein, including systems, methods/processes, devices, and/or apparatuses, may be implemented using well known processing devices, telephones (smart phones and/or mobile phones), tablet computers, servers, and/or, computers, such as a computer 1500 shown in FIG. 15. It should be noted that computer 1500 may represent communication devices, processing devices, servers, and/or traditional computers in one or more embodiments. For example, the auto-detection and adaptive configuration of high-definition multimedia interface (HDMI) ports embodiments, and any of the sub-systems or components respectively contained therein, may be implemented using one or more computers 1500 or portions thereof.

Computer 1500 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1500 may be any type of computer, including a desktop computer, a server, etc.

Computer 1500 includes one or more processors (also called central processing units, or CPUs), such as a processor 1506. Processor 1506 is connected to a communication infrastructure 1502, such as a communication bus. In some embodiments, processor 1506 can simultaneously operate multiple computing threads.

Computer 1500 also includes a primary or main memory 1508, such as random access memory (RAM). Main memory 1508 has stored therein control logic 1524 (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1518 having stored therein computer software 1526 (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well-known manner.

Computer 1500 also includes input/output/display devices 1504, such as touchscreens, LED and LCD displays, monitors, keyboards, pointing devices, etc.

Computer 1500 further includes a communication or network interface 1518. Communication interface 1520 enables computer 1500 to communicate with remote devices. For example, communication interface 1520 allows computer 1500 to communicate over communication networks or mediums 1522 (representing a form of a computer useable or readable medium), such as LANs, WANs, the Internet, etc. Network interface 1520 may interface with remote sites or networks via wired or wireless connections.

Control logic 1528 may be transmitted to and from computer 1500 via the communication medium 1522.

Any apparatus or manufacture comprising a computer useable or readable medium having control logic (software) stored therein is referred to herein as a computer program product or program storage device. This includes, but is not limited to, computer 1500, main memory 1508, secondary storage devices 1510, and removable storage unit 1516. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 15) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1506 of FIG. 15), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system comprising:
a high-definition multimedia interface (HDMI) mode detection circuit that comprises:
  a first detection switch comprising a first terminal electrically coupled to a first pin of an HDMI port and a second terminal;
  a first mode detection node electrically coupled to the second terminal;
  a second mode detection node electrically coupled to a second pin of the HDMI port;
  switch control logic;
  a voltage regulator; and
  a second detection switch;
the switch control logic configured to provide a first control signal and a second control signal;
the first detection switch configured to:
  receive a first HDMI signal from the HDMI port via the first pin;
  receive the first control signal;
  activate in response to receiving the first control signal and connect the first pin to the first mode detection node;
  provide an indication of a first HDMI mode at the first mode detection node based at least in part on the first HDMI signal; and
  deactivate subsequent to providing the indication and disconnect the second terminal from the first mode detection node;
the second mode detection node configured to:
  receive a second HDMI signal from the HDMI port via the second pin; and
  provide an indication of a second HDMI mode based on a first voltage value at the second pin;
the voltage regulator configured to provide an output voltage at an output terminal; and
the second detection switch comprising a third terminal electrically coupled to the first pin of the HDMI port, and a fourth terminal electrically coupled via a resistive component to the output terminal, the second detection switch configured to:
  receive the second control signal; and
  activate in response to receiving the second control signal and when the first detection switch is not activated to provide the first voltage value at the first pin.

2. The system of claim 1, wherein the first HDMI mode is an HDMI source mode, and
wherein the second HDMI mode is an HDMI sink mode.

3. The system of claim 2, wherein the first mode detection node and the second mode detection node are electrically coupled to a controller of an HDMI switch configured to adaptively control one or more switching circuits of the HDMI switch.

4. The system of claim 3, wherein the indication of the first HDMI mode at the first mode detection node prompts the controller of the HDMI switch to configure the HDMI port as an input port; and
wherein the indication of the second HDMI mode at the second mode detection node prompts the controller of the HDMI switch to configure the HDMI port as an output port.

5. The system of claim 1, wherein the first HDMI signal comprises a signal on a five volt connection line; and
wherein the second HDMI signal comprises a signal on a hot-plug detection connection line.

6. The system of claim 1, further comprising:
a third detection switch comprising a fifth terminal electrically coupled to the first pin of the HDMI port, and a sixth terminal electrically coupled to the output terminal, the third detection switch configured to:
  receive a third control signal from the switch control logic;
  activate in response to receiving the third control signal to provide a second voltage value at the first pin; and
  provide protection against a short-circuit condition between the first detection switch and the second detection switch when activated.

7. The system of claim 1, wherein the HDMI mode detection circuit further comprises a five volt output configured to provide a 5V voltage source to one or more HDMI sink connections.

8. The system claim 1, further comprising at least one additional HDMI mode detection circuit associated respectively with at least one additional HDMI port.

9. A method in a high-definition multimedia interface (HDMI) mode detection circuit that comprises a first detection switch comprising a first terminal electrically coupled to a first pin of an HDMI port and a second terminal, a first mode detection node electrically coupled to the second terminal, a second mode detection node electrically coupled to a second pin of the HDMI port, switch control logic, a voltage regulator, and a second detection switch comprising a third terminal electrically coupled to the first pin of the HDMI port and a fourth terminal electrically coupled via a resistive component to an output terminal, the method comprising; receiving a first HDMI signal from the HDMI port via the first pin at the first detection switch; providing a first control signal by the switch control logic; receiving the first control signal at the first detection switch; activating the first detection switch in response to receiving the first control signal and connecting the first pin to the first mode detection node; providing an indication of a first HDMI mode at the first mode detection node by the first detection switch based at least in part on the first HDMI signal; deactivating the first detection switch subsequent to providing the indication and disconnecting the second terminal from the first mode detection node; receiving a second HDMI signal from the HDMI port via the second pin at the second mode detection node; providing a second control signal by the switch control logic; providing an output voltage at the output terminal by the voltage regulator; receiving the second control signal at the second detection switch; activating the second detection switch in response to receiving the second control signal and when the first detection switch is not activated to provide a first voltage value at the first pin; and providing an indication of a second HDMI mode by the second mode detection node based on the first voltage value at the second pin.

10. The method of claim 9, wherein the first HDMI mode is an HDMI source mode, and
wherein the second HDMI mode is an HDMI sink mode.

11. The method of claim 10, wherein the first mode detection node and the second mode detection node are electrically coupled to a controller of an HDMI switch, the method further comprising:

adaptively controlling one or more switching circuits of the HDMI switch by the controller.

12. The method of claim 11, further comprising:

prompting the controller of the HDMI switch to configure the HDMI port as an input port based on the indication of the first HDMI mode at the first mode detection node; or prompting the controller of the HDMI switch to configure the HDMI port as an output port based on the indication of the second HDMI mode at the second mode detection node.

13. The method of claim 9, wherein the first HDMI signal comprises a signal on a five volt connection line; and wherein the second HDMI signal comprises a signal on a hot-plug detection connection line.

14. The method of claim 9, wherein the HDMI mode detection circuit comprises a third detection switch comprising a fifth terminal electrically coupled to the first pin of the HDMI port and a sixth terminal electrically coupled to the output terminal, the method further comprising:

receiving a third control signal from the switch control logic at the third detection switch;

activating the third detection switch in response to receiving the third control signal to provide a second voltage value at the first pin; and providing protection against a short-circuit condition between the first detection switch and the second detection switch when the third detection switch activated.

15. The method of claim 9, wherein the HDMI mode detection circuit further comprises a five volt output configured, the method further comprising:

providing a 5V voltage source to one or more HDMI sink connections by the five volt output.

* * * * *

UNITED STATES PATENT AND TRADEMARK OFFICE
CERTIFICATE OF CORRECTION

PATENT NO. : 10,565,153 B2
APPLICATION NO. : 14/945079
DATED : February 18, 2020
INVENTOR(S) : Pankaj Kumar Kashyap et al.

It is certified that error appears in the above-identified patent and that said Letters Patent is hereby corrected as shown below:

In the Claims

In Column 18, Line 26, in Claim 8, after "system" insert -- of --.

In Column 20, Lines 13-14, in Claim 14, after "switch activated" insert -- switch is activated --.

Signed and Sealed this
Fifth Day of May, 2020

Andrei Iancu
*Director of the United States Patent and Trademark Office*